United States Patent
Nilsson et al.

(10) Patent No.: US 7,147,755 B2
(45) Date of Patent: Dec. 12, 2006

(54) ULTRASONIC TRANSDUCER SYSTEM

(75) Inventors: Bo Nilsson, deceased, late of Oregrund (SE); by Asa Kristin Schroder Annersten, legal representative, Uppsala (SE); by Anja Kristin Hardin, legal representative, Oregrund (SE); by Ylva Kristin Lubeck, legal representative, Bollstabruk (SE); Hakan Dahlberg, Uppsala (SE)

(73) Assignee: Ultra Technology Europe AB, Vaxsjo (SE)

( * ) Notice: Subject to any disclaimer, the term of this patent is extended or adjusted under 35 U.S.C. 154(b) by 153 days.

(21) Appl. No.: 10/451,962

(22) PCT Filed: Nov. 28, 2002

(86) PCT No.: PCT/SE02/02195

§ 371 (c)(1),
(2), (4) Date: Jun. 27, 2003

(87) PCT Pub. No.: WO03/053856

PCT Pub. Date: Jul. 3, 2003

(65) Prior Publication Data

US 2004/0104179 A1    Jun. 3, 2004

Related U.S. Application Data

(60) Provisional application No. 60/339,380, filed on Dec. 11, 2001.

(51) Int. Cl.
*D21F 1/18* (2006.01)

(52) U.S. Cl. .................. 162/209; 162/203; 162/204; 162/50; 162/192; 210/748; 210/786; 210/780; 210/705

(58) Field of Classification Search ............... 162/192, 162/199, 272, 274, 209, 203, 204, 50; 134/1, 134/42, 184; 73/597, 639, 159; 310/346, 310/344, 341, 342; 210/748, 783, 780, 785, 210/705; 204/158
See application file for complete search history.

(56) References Cited

U.S. PATENT DOCUMENTS 4,340,488 A * 7/1982 Toth et al. ................. 210/705
2002/0050328 A1 * 5/2002 Hakansson et al. ......... 162/209

FOREIGN PATENT DOCUMENTS

WO    WO 95/28521    * 10/1995

* cited by examiner

*Primary Examiner*—Mark Halpern
(74) *Attorney, Agent, or Firm*—Rolf Fasth

(57) ABSTRACT

The method is for treating a liquid or slurry with an ultrasonic energy. A movable endless member is provided that is permeable to a liquid. A transverse foil is disposed below the member and extends across the member and a transducer is in operative engagement with the foil. The member is moved about rollers. The transducer generates pressure pulses into the foil to form implosion bubbles in the liquid disposed above the member. The implosion bubbles have a first diameter (d1). A gap is formed between the member and the foil. The gap represents a distance (d2) that is less than the diameter (d1) of the bubbles to prevent any bubbles of critical size to be captured in the gap.

6 Claims, 7 Drawing Sheets

ULTRASONIC TRANSDUCER SYSTEM

PRIOR APPLICATIONS

This is a U.S. national phase patent application that claims priority from PCT/SE02/02195, filed 28 Nov. 2002, that claims priority from U.S. Provisional Patent Application No. 60/339,380, filed 11 Dec. 2001.

TECHNICAL FIELD

The present invention is an ultrasonic transducer and reactor system. More particularly, the transducer system may be used on moving endless members that are permeable to liquid.

BACKGROUND AND SUMMARY OF INVENTION

Ultrasonic energy has been applied to liquids in the past. Sufficiently intense ultrasonic energy applied to a liquid, such as water, produces cavitation that can induce changes in the physiochemical characteristics of the liquid. The subject of sonochemistry, which deals with phenomena of that sort, has grown very much during recent years.

The published material in sonochemistry and related subjects all pertains to batch processes, that is, the liquid solution or dispersion to be treated is placed in a container. The liquid in the container is then stirred or otherwise agitated, and ultrasound is applied thereto. It is then necessary to wait until the desired result, physical or chemical change in the liquid, is achieved, or until no improvement in the yield is observed. Then the ultrasound is turned off and the liquid extracted. In this way liquid does not return to its initial state prior to the treatment with ultrasonic energy. In this respect, the ultrasound treatment is regarded as irreversible or only very slowly reversible.

Far from all industrial processes using liquids are appropriately carried out in batches, as described above. In fact, almost all large-scale processes are based upon continuous processing. The reasons for treating liquids in continuous processes are many. For example, the fact that a given process may not be irreversible, or only slowly reversible, and requires that the liquid be immediately treated further before it can revert to its previous state.

Shock waves external to collapsing bubbles driven onto violent oscillation by ultrasound are necessary for most if not all physiochemical work in liquid solutions. The underpressure pulses form the bubbles and the pressure pulses compress the bubbles and consequently reduces the bubble diameter. After sufficient number of cycles, the bubble diameter is increased up to the point where the bubble has reached its critical diameter whereupon the bubble is driven to a violent oscillation and collapses whereby a pressure and temperature pulse is generated. A very strong ultrasound field is forming more bubbles, and drives them into violent oscillation and collapse much quicker.

A bubble that is generated within a liquid in motion occupies a volume within said liquid, and will follow the speed of flow within said liquid. The weaker ultrasound field it is exposed to, the more pulses it will have to be exposed to in order to come to a violent implosion. This means that the greater the speed of flow is, the stronger the ultrasound field will have to be in order to bring the bubbles to violent implosion and collapse. Otherwise, the bubbles will leave the ultrasound field before they are brought to implosion. A strong ultrasound field requires the field to be generated by very powerful ultrasound transducers, and that the energy these transducers generate is transmitted into the liquid to be treated. Based upon this requirement, Bo Nilsson and Håkan Dahlberg started a development of new types of piezoelectric transducer that could be driven at voltages up to 13 kV, and therefore capable of generating very strong ultrasonic fields. These developments are described in U.S. Pat. Nos. 5,955,823, 6,016,023 and 6,137,209. A method and a device for attaching high power ultrasonic transducers are described in U.S. Pat. No. 6,308,585.

A very strong ultrasonic source will cause a cushion of bubbles near the emitting surface. The ultrasound cannot penetrate through this cushion, and consequently no ultrasound can penetrate into the medium to be treated. The traditional way to overcome this problem is to reduce the power in terms of watts per unit area of emitting surface applied to the ultrasonic transducers. As indicated above, the flow speed of the medium to be treated will require a stronger ultrasound field and therefore an increased power applied to the ultrasonic transducers. The higher the power input is, the quicker the cushion is formed, and the thicker the formed cushion will be. A thick cushion will completely stop all ultrasound penetration into a liquid located on the other side of this cushion. All the cavitation bubbles in this cushion will then stay in the cushion and cause severe cavitation damage to the ultrasound transducer assembly area leading to a necessary exchange of that part of the ultrasound system.

This means that little or no useful ultrasound effect is achieved within the substrate to be treated, and that the ultrasound equipment may be severely damaged. There is a need to solve the problems outline above. The transducer systems of the present invention provide a solution to the problems.

More particularly, the method is for treating a liquid with an ultrasonic energy. A movable endless member is provided that is permeable to a liquid. A transverse foil is disposed below the member and extends across the member and a transducer is in operative engagement with the foil. The member is moved about rollers. The transducer generates pressure pulses into the foil to form implosion bubbles in the liquid disposed above the member. The implosion bubbles has a first diameter d1. A gap is formed between the member and the foil. The gap represents a distance d2 that is less than the diameter d1 of the bubbles to prevent any bubbles to be captured in the gap. Also, distances between fibers building rooms in the fabric are preferably less than the distance d2.

DETAILED DESCRIPTION

Figure 1:
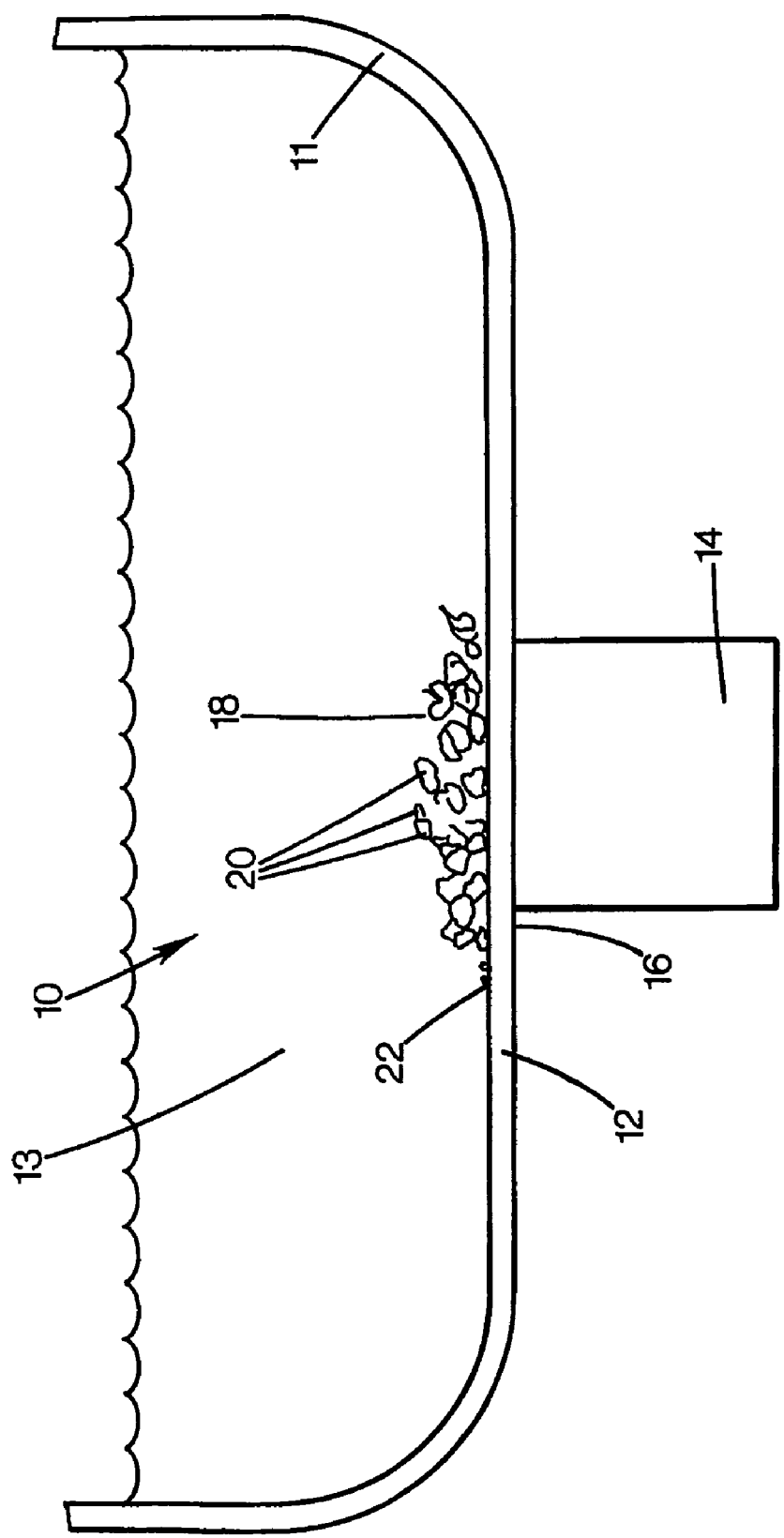
FIG. 1 is a schematic side view of the formation of a reactor of a prior art system.

FIG. 1 is a side view of a prior art transducer system 10 that has a container 11, such as a stainless reactor, with a wall 12 for containing a liquid 13. A transducer 14 is attached to an outside 16 of the wall 12. When the transducer 14 is activated, a pillow 18 of cavitation bubbles 20 are formed on an inside 22 of the wall 12 due to the fracture zone in the liquid 13 that may be a result of fracture impressions on the inside 22 of the wall 12. The bubbles may be held to the inside wall due to the surface tension of the liquid 13. The bubbles 20 are good insulators and prevent the effective transmission of the ultrasonic energy into the liquid 13. The under-pressure pulses of the ultrasonic energy transmitted by the transducer 14 create the cavitation bubbles. In this way, the pressure inside the bubbles is very low.

Figure 2:
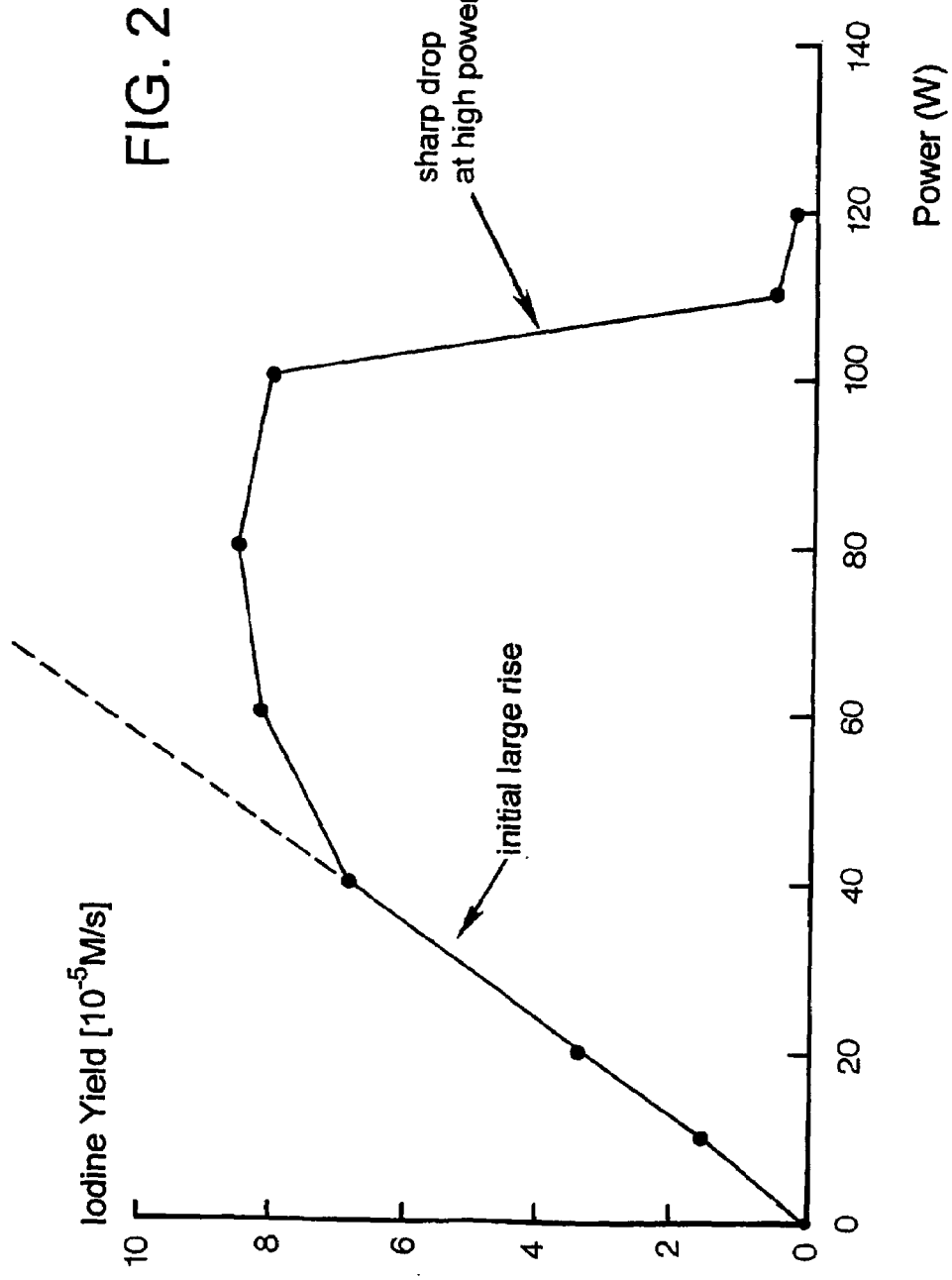
FIG. 2 is a graphical illustration of the correlation between iodine yield and acoustic power.

FIG. 2 is a graphical illustration that shows the iodine yield is affected by increased acoustic power on the system 10. The more power is applied, the thicker the formation of the bubbles 20, as shown in FIG. 1, and the yield increase is reduced and drops sharply at power ratings over 100 Watts in this case. In this way, the cavitation bubbles severely limit the usefulness of increasing the acoustic power to improve the iodine yield.

Figure 3:
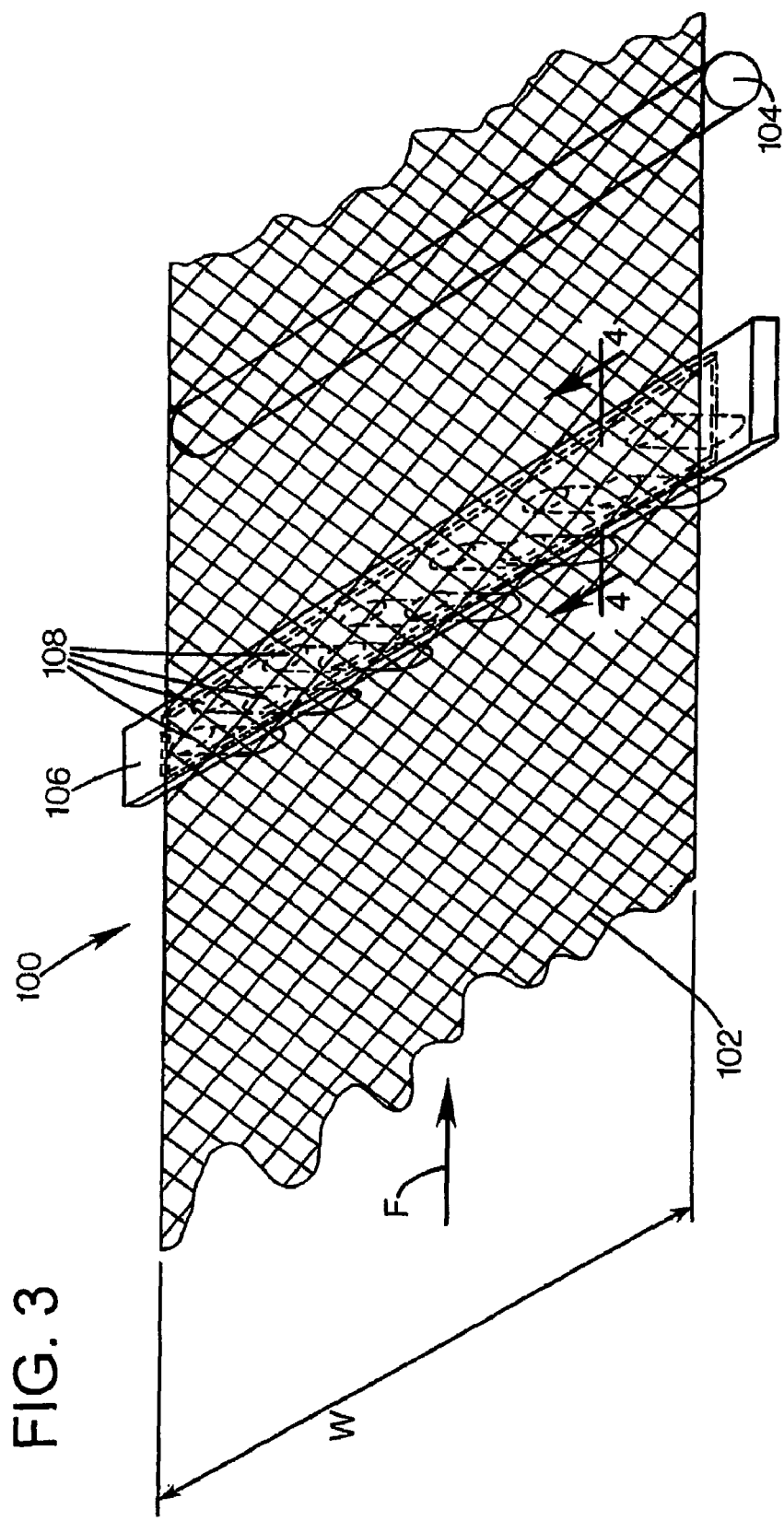
FIG. 3 is a perspective view of the transducer system of the present invention disposed below a movable endless member.
Figure 5A:
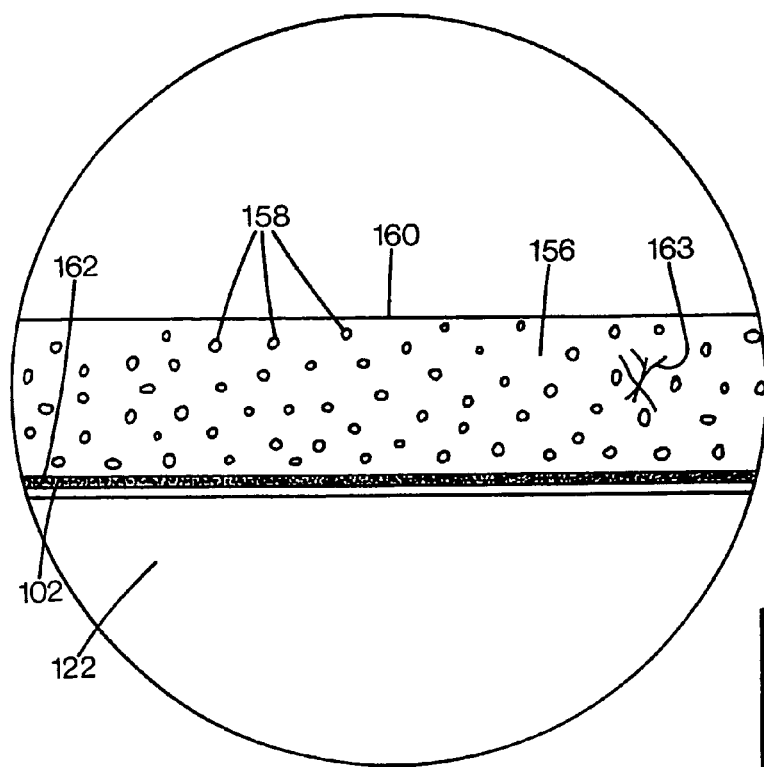
FIG. 5 is an enlarged view of cavitation bubbles dispersed in slurry disposed above the movable endless medium.
Figure 5B:
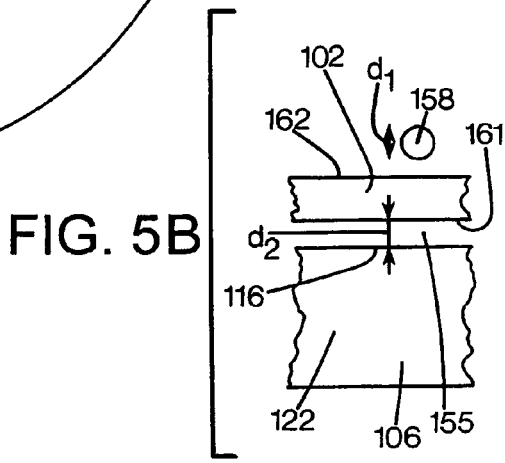

FIG. 3 is a perspective view of the transducer system 100 of the present invention. The system has a movable endless permeable medium 102, such as a woven material, paper machine plastic wire or any other bendable medium permeable to liquids, that is rotatable about rollers 104 that guide the medium 102 in an endless path. As explained below, it is important that the medium is permeable to a liquid that may carry ultrasonic energy to the liquid disposed above the medium 102 so as to effectively create the cavitation bubbles in the liquid or slurry to be treated. The ultrasonic energy may be used to reduce flocculation 163, best shown in FIG. 5A, of fibers in the liquid to be treated because the bubbles implode or collapse to generate pressure pulses to the fiber flocculation 163 so that the fibers are separated from one another to evenly distribute or disperse the fibers in the liquid. The pressure pulses may be about 500 bars so the pulses are more forceful than the forces that keep the fiber flocculation together. In general, the longer the fibers or the higher the fiber consistency the higher the tendency of flocculation.

The medium may have a rotational speed up to 2000 meters per minute in a forward direction as shown by an arrow (F). An elongate foil 106, made of, for example, steel or titanium is disposed below the permeable medium 102 and extends across a width (W) of the medium 102. A plurality of transducers 108, such as magneto-strictive, piezoelectric or any other suitable type of transducers, is in operative engagement with the foil 106 such as by being integrated therewith or attached thereto.

Figure 4:
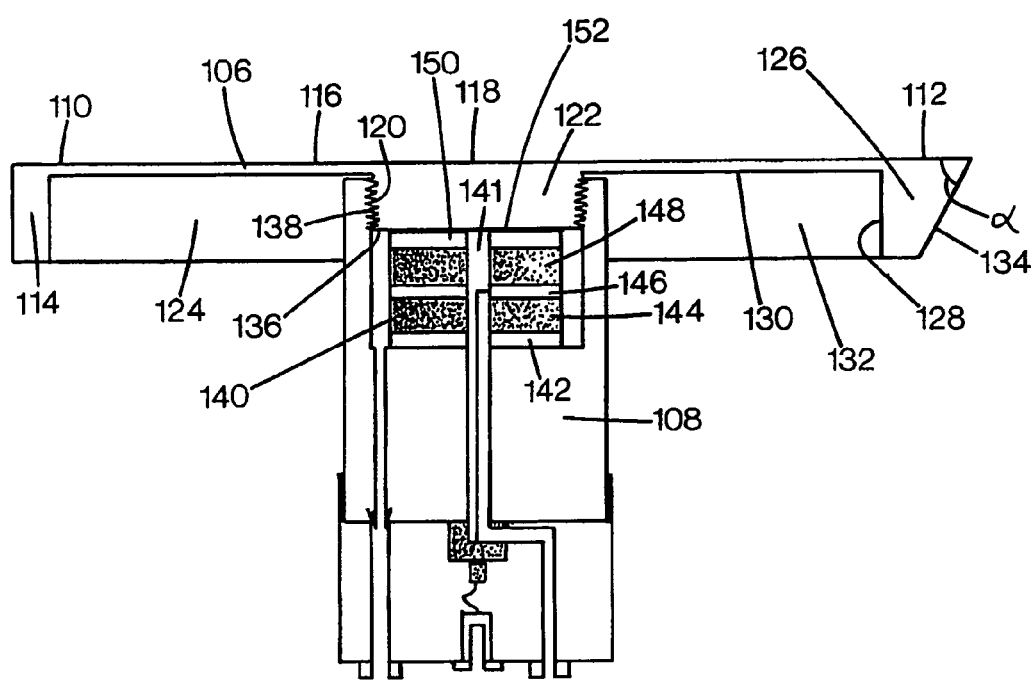
FIG. 4 is a cross-sectional view along line 4—4 in FIG. 3.

FIG. 4 is a detailed view of one of the transducers 108 attached to a mid-portion 118 of the hydrodynamic foil 106. More particularly, the foil 106 has a rear portion 110 and a front portion 112. The rear portion 110 has a rectangular extension 114 that extends away from a top surface 116 of the foil 106. The mid-portion 118 of the foil 106 has a threaded outside 120 of a connecting member 122 also extending away from the top surface 116 so that a cavity 124 is formed between the extension 114 and the connecting member 122.

The front portion 112 has an extension 126 that extends away from the top surface 116 and has a back wall 128 that is perpendicular to a bottom surface 130 of the foil 106 so that a cavity 132 is formed between the back wall 128 and the member 122. The extension 126 has a front wall 134 that forms an acute angle alpha with the top surface 116. The cavities 124 and 132 provide resonance to the ultrasound transmitted by the transducers 108 to reinforce the amplitude of the vibrations of the ultrasound. The front wall 134 forms an acute angle alpha with a top surface 116 of the foil 106 to minimize the pressure pulse when the water layer under the member is split by the front wall 134 so a larger part of the water is going down and only a minor part is going between the top side of the foil 116 and the member 102. When the member 102 is moving over the foil surface 116 a speed dependant under-pressure is created that will force down the member 102 against the foil surface 116. When the member is leaving the foil 106 there is room to urge the liquid 156 through the member 102.

In other words, the design of the extension 126 is particularly suitable for paper manufacturing that has a slurry of water and fibers. The water layer split at the front wall 134 creates an under-pressure pulse so that the water on top of the moving medium flows through the medium 102 and into a container there below. The design of the extension 126 may also be designed for other applications than paper making that is only used as an illustrative example.

The transducer 108 has a top cavity 136 with a threaded inside wall 138 for threadedly receiving the member 122. The transducer 108 may be attached to the foil 106 in other ways, such as by adhesion or mechanical fasteners, and the present invention is not limited to the threaded connection described above.

Below the top cavity 136, a second housing cavity 140 is defined therein. The cavity 140 has a central segment 141 to hold a bottom cooling spacer 142, a lower piezoelectric element 144, a middle cooling spacer 146, an upper piezoelectric element 148 and a top cooling spacer 150 that bears against a bottom surface 152 of the connecting member 122. The spacers 142, 146, 150 are used to lead away the frictional heat that is created by the elements 144, 148.

By using three spacers, all the surfaces of the elements 144, 148 may be cooled. As the piezoelectric elements 144, 148 are activated, the thickness of the elements is changed in a pulsating manner and ultrasonic energy is transmitted to the member 122. For example, by using a power unit with alternating voltage of a level and frequency selected to suit the application at hand, the elements 144, 148 start to vibrate radially. In this way, if the AC frequency is 20 kHz then a sound at the same 20 kHz frequency is transmitted. It is to be understood that any suitable transducer may be used to generate the ultrasonic energy and the invention is not limited to piezoelectric transducers.

Figure 5:
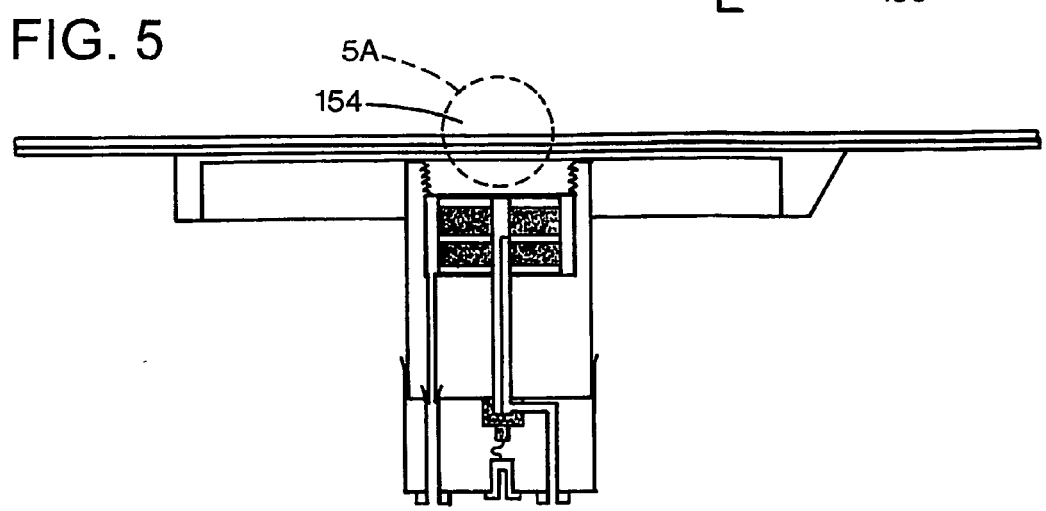

FIG. 5 is an enlarged view of a central segment 154 so that the permeable medium 102 bears or is pressed against the top surface 116 of the member 122 of the foil 106 so there is not sufficient space therebetween to capture cavitation bubbles. In other words, an important feature of the present invention is that a gap 155 defined between the foil 106 and the medium 102 has is less than one half critical bubble diameter so that no bubbles of critical size can be captured therebetween. The gap 155 between the member 102 and the foil 106 is defined by the tension in the member 102, the in-going angle between the member 102 and the foil 106, the pressure pulse induced by the water layer split at the front of the foil 106, the geometry of the foil 106, the under-pressure pulse when the member 102 leave the foil 106 and the out-going angle of the member 102. The bubbles 158 has a diameter d1 that is at least twice as long as the distance d2 of the gap 155 between the top surface 116 of the foil 106 and the bottom surface 161 of the permeable medium 102. In this way, the cavitation bubbles 158 are forced through the permeable medium 102 to disperse into the liquid substance 156 that is subject to the ultrasonic treatment and disposed above the medium 102. The liquid substance 156 has a top surface 160 so that the bubbles 158 are free to move between the top surface 160 of the substance 156 and a top surface 162 of the medium 102. In general, the effect of the ultrasonic energy is reduced by the square of the distance because the energy is absorbed by the liquid. In this way, there are likely to be more cavitation bubbles formed close to the medium 102 compared to the amount of bubbles formed at the surface 160. An important feature is that because the medium 102 is moving and there is not enough room between the foil 106 and the medium 102, no cavitation bubbles are captured therebetween or along the top surface 162 of the movable medium 102.

Figure 6:
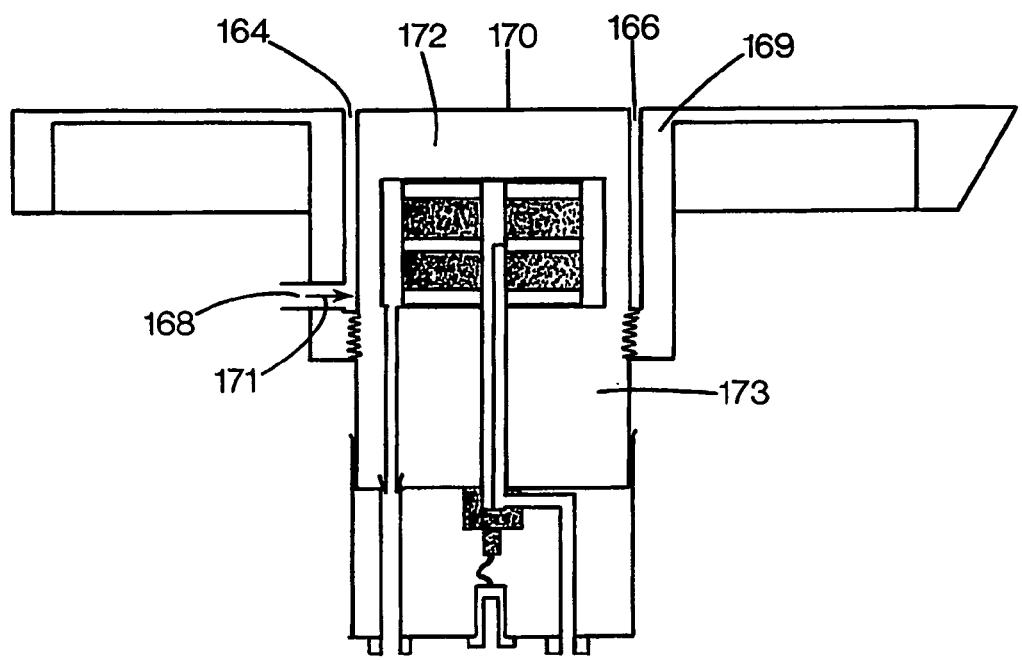
FIG. 6 is a cross-sectional view of a second embodiment of the transducer system of the present invention.

The second embodiment of a transducer system 173 shown in FIG. 6 is virtually identical to the embodiment shown in FIG. 4 except that the transducer system 173 has a first channel 164 and a second channel 166 defined therein that are in fluid communication with an inlet 168 defined in a foil member 169. The channels 164, 166 extend perpendicularly to a top surface 170 of a connecting member 172. The channels 164, 166 may extend along the foil 169 and may be used to inject water, containing chemicals, therethrough. For example, in paper making, the chemicals may be bleaching or softening agents. Other substances such as foaming agents, surfactant or any other substance may be used depending upon the application at hand. The ultrasonic energy may be used to provide a high pressure and temperature that may be required to create a chemical reaction between the chemicals added and the medium. The channels 164, 166 may also be used to add regular water, when the slurry above the moving medium is too dry, so as to improve the transmission of the ultrasonic energy into the slurry. The chemicals or other liquids mentioned above may also be added via channels in the front part of the transducer assembly bar 106. If the liquid content of the medium to be treated is very low, the liquid may simply be applied by means of spray nozzles under the web. Also in those cases may the applied liquid be forced into the web by the ultrasonic energy and afterwards be exposed to sufficient ultrasound energy to cause the desired reaction to take place between the chemicals and the medium to be treated.

Figure 7:
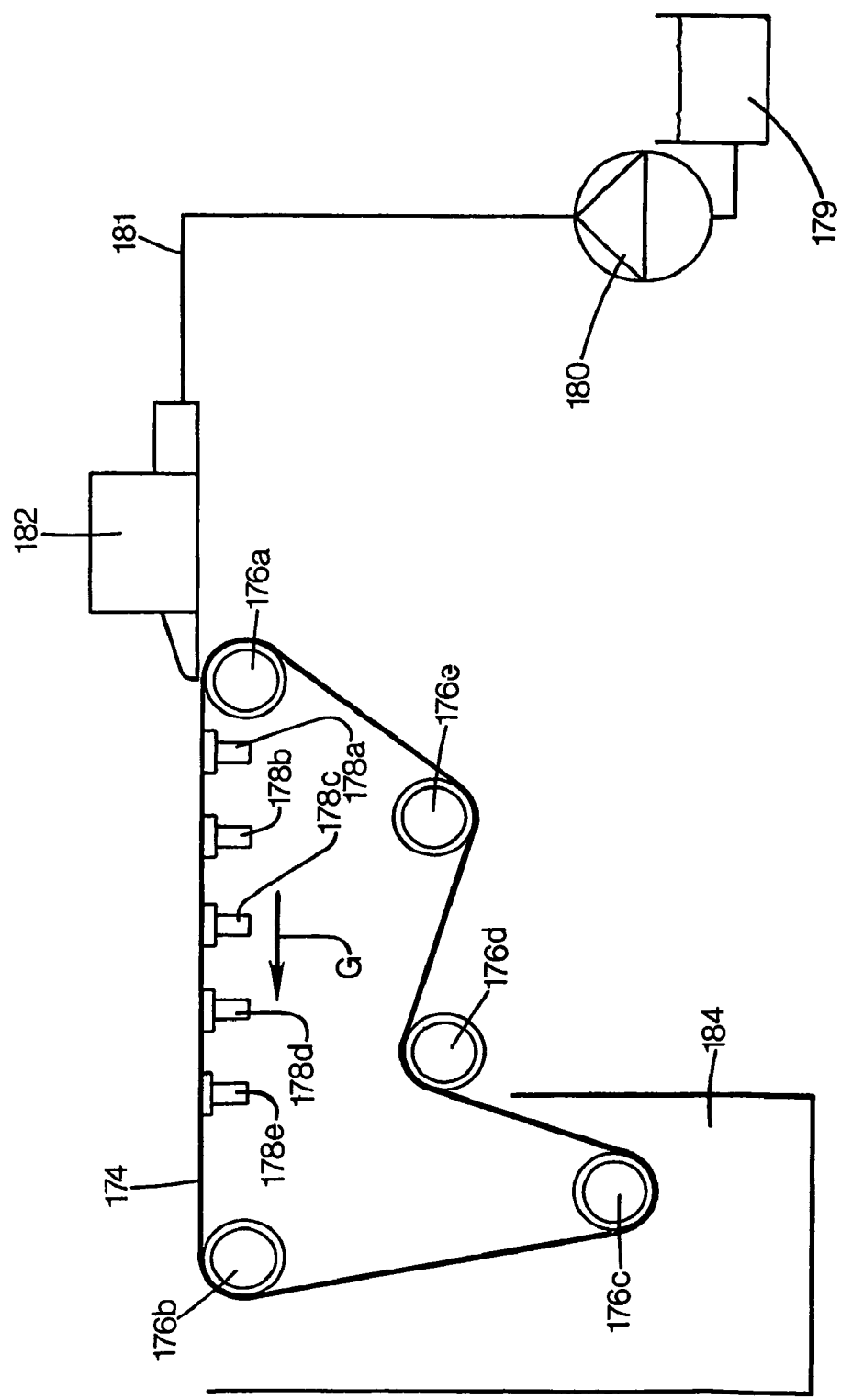
FIG. 7 is a cross-sectional view of a plurality of transducers disposed below a movable endless medium.

FIG. 7 is an overall side view showing an endless bendable permeable medium 174 that are supported by rollers 176a–e. Below the medium 174 is a plurality of transducer systems 178a–e for increased output by adding more ultrasonic energy to the system. By using a plurality of transducers, different chemicals may be added to the slurry 179, as required. The slurry 179 contains fibers or other solids, to be treated with ultrasonic energy, is pumped by a pump 180 in a conduit 181 via a distributor 182 onto the medium 174 that moves along an arrow (G). The treated fibers may fall into a container 184.

The transducer system of the present invention is very flexible because there is no formation of cavitation bubble pillows in the path of the ultrasonic energy. By using a plurality of transducers, it is possible to substantially increase the ultrasonic energy without running into the problem of excessive cavitation bubbles to block the ultrasound transmission. The plurality of transducers also makes it possible to add chemicals to the reactor in different places along the moving medium, as required.

While the present invention has been described in accordance with preferred compositions and embodiments, it is to be understood that certain substitutions and alterations may be made thereto without departing from the spirit and scope of the following claims.

We claim:

1. A method of treating a liquid or a slurry with ultrasonic energy to form and implode bubbles disposed in the liquid or slurry to reduce fiber flocculation of fibers disposed in the liquid or slurry, comprising:

providing a movable endless member being permeable to a liquid, a transverse foil being disposed below the movable endless member and extending across the movable endless member, a transducer being in operative engagement with the transverse foil, the movable endless member and the transverse foil having a gap formed therebetween, the gap representing a gap distance;

moving the movable endless member about rollers;

the transducer generating vibrations into the transverse foil to form imploding bubbles in the liquid disposed above the movable endless member, the bubbles having a critical diameter prior to implosion that is greater than the gap distance to prevent the imploding bubbles from being disposed in the gap and the bubbles imploding to generate pressure pulses to the fiber flocculation to separate the fibers from one another.

2. The method according to claim 1 wherein the method further comprises providing the transverse foil with cavities.

3. The method according to claim 1 wherein the method further comprises providing the transverse foil with a front wall.

4. The method according to claim 1 wherein the method further comprises providing the transducer with spacers.

5. The method according to claim 1 wherein the method further comprises forcing the imploding bubbles disposed in the liquid or slurry through a transverse medium.

6. The method according to claim 1 wherein the method further comprises the transducer having a channel defined therein and injecting chemicals through the channel.

* * * * *